June 24, 1930. F. H. BRAMWELL 1,766,593
INSULATOR FOR ELECTRIC CONDUCTORS
Filed May 1, 1926
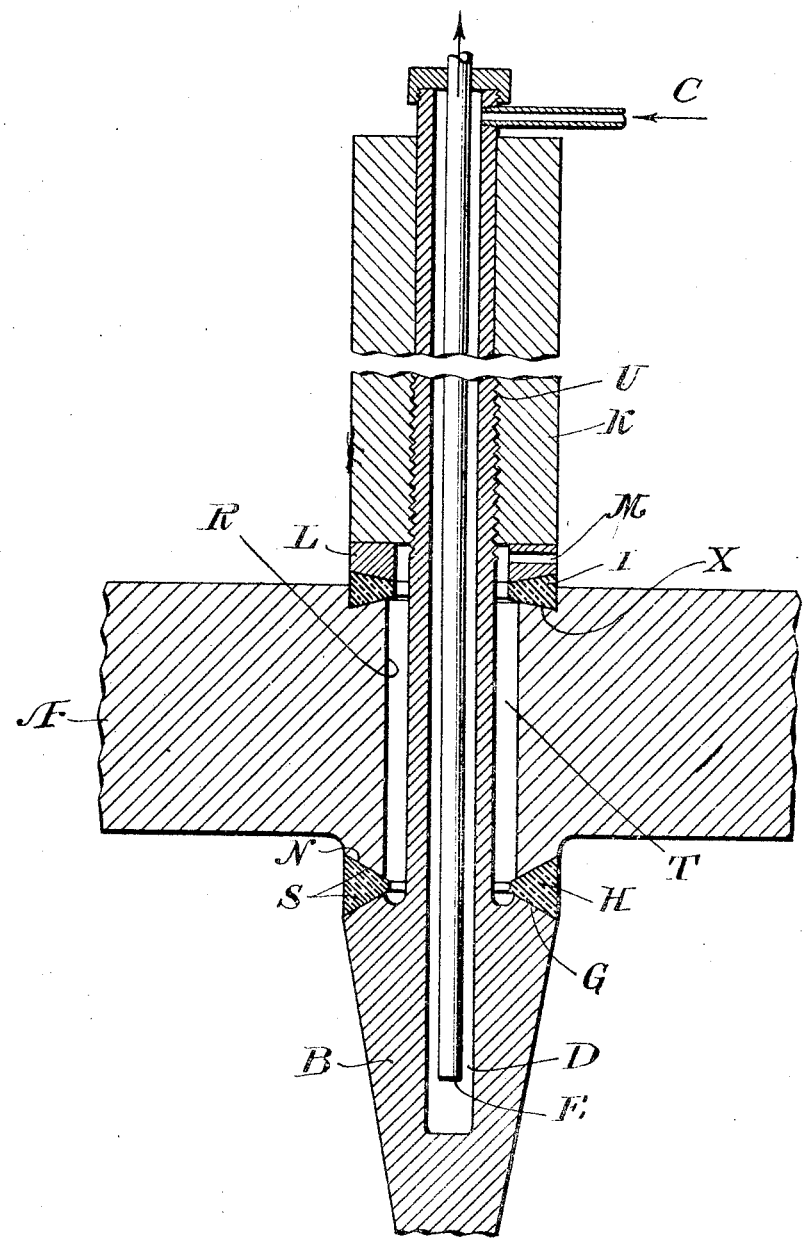
INVENTOR
FRANCIS HERBERT BRAMWELL
BY
ATTORNEYS Patented June 24, 1930

1,766,593

UNITED STATES PATENT OFFICE

FRANCIS HERBERT BRAMWELL, OF HARTFORD, ENGLAND, ASSIGNOR TO ATMOSPHERIC NITROGEN CORPORATION, OF SOLVAY, NEW YORK, A CORPORATION OF NEW YORK

INSULATOR FOR ELECTRIC CONDUCTORS

Application filed May 1, 1926, Serial No. 105,990, and in Great Britain May 4, 1925.

This invention relates to insulators for electric conductors and more particularly to such as are needed for conductors which penetrate electrically conductive walls of vessels under high fluid pressure.

In using an electric current within a vessel under fluid pressure, it is necessary to have one or more electric conductors pass through or penetrate the walls of the vessel which, being generally of metal, are themselves conductors of electric currents. The electric conductor leading into the interior of such a vessel must therefore not only be insulated from the wall of the vessel, but must be so seated as to provide a hermetically closed seal. This foregoing situation arises specifically in arts such as the synthetic ammonia art where the catalytic conversion of a gas mixture of nitrogen and hydrogen to ammonia is required to be started or to be conducted within a metallic vessel under high pressure and at an elevated temperature. Referring particularly to the synthetic ammonia art, for example, in which the initial nitrogen-hydrogen mixture is required to pass over the catalyst at an elevated temperature, the reaction itself is exothermic and once started will maintain itself, provided that the heat losses from the system are not too great, and that the make of ammonia exceeds a few per cent. When starting up from the cold, however, this source of heat is not available and some other means must be provided, which generally takes the form of an electrically heated resistance disposed within the converter or pressure vessel in such a way that the entering gases may flow over it and become heated before passing over the catalyst. Eventually the catalyst is raised to the required temperature and the conditions are then such that the heat evolved by the synthesis reaction is adequate for maintaining the temperature at the normal required value. It may sometimes happen that the temperature of the catalyst falls, owing to greater heat losses or impaired efficiency of heat interchange between the hot and cold gases, or decrease in the activity of the catalyst itself, and then the make of ammonia will fall off and the heat of reaction will be adequate for normal operation of the converter. At such a juncture it becomes necessary to preheat the entering gases so that they may restore heat to the catalyst, the autothermic state of operation being once more brought about when the ammonia make has been enhanced. During the operation of an ammonia converter, therefore, there arise occasions for the use of a preheater to heat the comparatively cold entering gases, apart from starting from the cold.

The present invention is concerned with the insulation of the conductors required in instances of this character or equivalent situations. Such conductors generally pass through the outer shell of the converter and lead to a suitable resistance coil in the interior thereof. At the points at which the conductors penetrate the shell, joints must be made which shall withstand the internal gas pressure of several hundred atmospheres and at the same time insulate the conductors from the shell itself. Moreover, the insulating joints must be capable of resisting the effects of a temperature of from 100°–200° C. which prevails in their neighborhood.

The invention is illustrated in the accompanying drawing, in which the figure is a sectional view of a portion of a wall of an ammonia converter with an embodiment of my invention associated therewith.

In the drawing the letter A designates the cover of the converter or pressure vessel which is made, for example, of suitable alloy steel, i. e. materials which are electrically conductive. A conductor B, composed of any suitable material, preferably mild steel in the present case, penetrates or passes through an aperture R in the cover and conducts the electricity from an outside source to a resistance heater (not shown) in the interior of the converter. The conductor B has a smaller cross-sectional area than the aperture R, and, hence, the conductor may be insulated from the interior of the wall A by the air gap T without requirement of any insulating packing material at this point, although in some cases it may be desirable to use a sleeve of insulating material to fill the air gap.

An annular insulator washer H is interposed between the shoulder G on the expanded head of the conductor and the annular shoulder N on the inner wall of the cover A adjacent to the edge of the aperture R. The washer has axially tapering faces S, i. e. the incline of the faces tapers from the rim of the washer towards the center thereof. A preferred section for this washer as shown in the drawing is a symmetrical trapezium and a suitable angle between the inclined faces may be about 30°. In order that the subsequent load on the washer may be taken over the maximum of bearing surface, its inclined faces should fit closely on the corresponding machined surfaces of the conductor and cover respectively. If necessary the faces of the washer may also be machined. In the drawing the rim of the washer is shown fitted flush with the outside of the conductor and with a piece projecting from the cover, but although this is the preferred arrangement the condition is not essential and the washer may project beyond or overlap the metal edges or vice versa. As a matter of convenience a second washer I, necessary to effect the insulation of the conductor, and which is situated at the outside of the cover A, is identical in shape with the lower pressure resisting washer H. The outer washer I has not to withstand any gas pressure and, since its chief function is to serve as an insulating support for the conductor, and as it constitutes a part of the means for tightening the conductor in position, any convenient shape suitable for that purpose may be adopted. A sleeve K is screwed on to the conductor stem and carefully tightened until the conductor is firmly established in position. A supplementary ring or rings L may be used to transmit the action of K to the washer I and to protect it.

A small radial hole M is provided in one of the supplementary washers L to enable any gas which leaks into the air gap T to escape.

The insulating washers H and I may be made of any suitable material, preferably a material such as is hereinafter described more particularly.

In order to protect the conductor against the destructive influences of high temperatures, it is desirable to have internal cooling means associated with the conductor. An inlet connection C secured to the outer end of the conductor in any suitable manner leads to an internal annular space D. The cooling water enters through C, flows downwardly through D, and upwardly through an outlet pipe E which discharges the water at any convenient point.

The installation of my invention is accomplished by seating the washer H against the seat G on the expanded head of the conductor B and then inserting the conductor B through the aperture R in the cover or wall A from the interior of the converter. Insulator I and ring L are slipped on the conductor B from the exterior of the converter. The sleeve K is now screwed on the conductor and is tightened until the desired compression has been brought to bear on insulator washer H.

One important result of the invention flows from the fact that the taper of the washer is made of such magnitude that when the apparatus is assembled and subjected to the pressure of the fluid contained therein during operation, the hoop stress in the material of the washer due to its being compressed between the oblique surfaces on the conductor and the inner wall of the pressure vessel is reduced to a very low value, and is preferably made a small hoop compression, the main stress being radial compression of which the value can never exceed the internal pressure. Under these conditions the washer satisfactorily fulfils its function as an insulator and at the same time makes a perfectly tight joint against the internal gas pressure, since it is held tight by the internal gas pressure acting against the component of a pressure mechanically established at the flaring seats G and N.

With respect to the preferred material for the washers H and I, I have discovered that a certain composition is particularly advantageous. This composition comprises an insulating material, such as a synthetic resin, preferably a phenol-formaldehyde condensation product, mixed with a mineral fibre such as asbestos. I have found that a mixture containing 40% of a synthetic resin and 60% of short-fibre asbestos makes a very satisfactory insulating washer. With this type of washer it has been found possible to make a gas-tight joint which resisted a pressure of several hundred atmospheres and at the same time withstood a temperature of 100°–200° C. The inclusion of a filling medium reduces the brittleness of the synthetic resin and the use of asbestos for this purpose enables the material to withstand the high temperatures.

Although the invention has been described with particular reference to the synthetic ammonia art, it is to be understood that the scope of the invention is not to be limited thereto. For example, my invention is adapted to the electrochemical art wherein electrodes or other conductor elements must be insulated from and yet must be sealed to the wall of a vessel under fluid pressure and frequently at elevated temperatures. Moreover, it will be obvious to those skilled in the art that various modifications and changes may be made without departing from the nature of my invention as defined in the appended claims.

I claim:

1. In combination a conductive wall, a conductor passing through the said wall, the said conductor being separated from the interior of said wall by an air gap, cooling means associated with the interior of the said conductor, an insulating washer having interiorly tapering faces positioned around the conductor on each side of the said wall, one of said washers contacting with said conductor and said wall, means associated with the said conductor to force the said washers against the wall, whereby a fluid-tight joint is formed by the action of an internal fluid pressure acting against the component of a pressure mechanically established at the flaring seats, and a wedging ring positioned between the said means and the outer face of one of said washers, the said ring having ventilating means associated therewith to communicate with the air gap between the conductor and the wall.

2. The combination of a vessel of electrically conductive material adapted to withstand high internal pressures and having a wall provided with an opening therein, an electrical conductor passing through said opening from the exterior to the interior of the vessel without making electrical contact with said vessel, and being provided with a shoulder disposed inside the vessel, the shoulder being larger than the mouth of said opening through the wall of the vessel and having an annular seat facing the edge portions of said mouth of said opening and inclined outwardly from its inner circumference and away from the mouth of the opening, a corresponding annular seat being associated with the inside of the wall of the vessel around its opening and presenting a surface inclined outwardly from its inner circumference and oppositely divergent with respect to the inclined face of said shoulder, an annular washer of insulating material presenting opposed surfaces to said seats, said opposed surfaces being tapered from the outer rim of the washer toward its center, said washer thus having a trapezoidal cross-section wherein the larger base is the outer periphery of the washer and fitting snugly between the aforementioned seats associated with the shoulder of the conductor and with the wall of the vessel, mechanical means for compressing said washer between said seats, said vessel and said conductor being out of electrical connection through said mechanical means and gas under high pressure within the vessel, the pressure of said gas acting upon the outer periphery of the washer and tending to wedge said washer between the tapered surfaces presented by said seats.

3. An apparatus as claimed in claim 2 wherein the washer is composed of organic insulating material having mineral fibre incorporated therein.

4. An apparatus as claimed in claim 2 wherein the washer is composed of a synthetic resin having asbestos incorporated therein.

5. An apparatus as claimed in claim 2 wherein the washer is composed of substantially 40% of a resistant synthetic resin in which is incorporated substantially 60% of asbestos.

In testimony whereof I have hereunto set my hand.

FRANCIS H. BRAMWELL.